United States Patent

Cheng

[11] Patent Number: 5,294,158
[45] Date of Patent: Mar. 15, 1994

[54] COLLAPSABLE HANDCART

[76] Inventor: Chiun J. Cheng, No. 20, Lane 327, Sec. 2, Chung Shan Rd., Chung Ho City, Taipei Hsien, Taiwan

[21] Appl. No.: 56,465

[22] Filed: May 5, 1993

[51] Int. Cl.$^5$ .............................................. B62B 3/02
[52] U.S. Cl. .......................... 280/641; 280/DIG. 4; 280/651
[58] Field of Search ............... 280/47.26, 47.34, 641, 280/642, 645, 652, 654, 659, DIG. 3, DIG. 4, 5.2, 651

[56] References Cited

U.S. PATENT DOCUMENTS

| | | | |
|---|---|---|---|
| 2,840,142 | 6/1958 | Haug et al. | 280/DIG. 3 X |
| 3,207,526 | 9/1965 | Brodeck | 280/652 |
| 3,236,536 | 2/1966 | Shore | 280/652 |
| 3,310,317 | 3/1967 | Luff | 280/652 |
| 3,514,123 | 5/1970 | Injeski | 280/652 |
| 3,774,929 | 11/1973 | Stanley | 280/DIG. 4 X |
| 4,339,141 | 7/1982 | Thiboutot | 280/652 |
| 4,722,538 | 2/1988 | Freyman | 280/DIG. 4 X |
| 4,822,070 | 4/1989 | Korona et al. | 280/DIG. 4 X |

FOREIGN PATENT DOCUMENTS 276380 10/1964 Netherlands ................. 280/652

Primary Examiner—Brian L. Johnson
Attorney, Agent, or Firm—Bacon & Thomas

[57] ABSTRACT

A collapsable handcart includes a first axle on which a first pair of wheels are rotatably mounted, a second axle on which a second pair of wheels are rotatably mounted, a substantially inverted U-shaped slanted handle member securely mounted to the second axle at two distal ends thereof, and a collapsable basket. A positioning member extends laterally outward from a lower portion of the first frame member of the basket adjacent to the first axle. A supporting member extends between lower ends of the inverted U-shaped handle member and above the second pair of wheels and below the bottom frame member. A first pair of pivotal members each of which have a first end pivoted to the bottom portion of a second frame member of the basket adjacent to the second axle and a second end pivoted to a mediate portion of the handle member. A second pair of pivotal members each of which have a first end pivoted to the mediate portion of the handle member and a second end. A rod is provided for connecting the second ends of the second pair of pivotal members. Each second pivotal member has three recessed portions at an upper side thereof. When the positioning member respectively engages with a lowermost, mediate, and uppermost recessed portions in the second pair of pivotal members, the handcart is in a fully extended, semi-collapsed, and fully collapsed status, respectively.

4 Claims, 5 Drawing Sheets

5,294,158

COLLAPSABLE HANDCART

BACKGROUND OF THE INVENTION

The present invention relates to a collapsable handcart and, more particularly, to a collapsable handcart which is able to "climb" stairs.

Collapsable handcarts are common in daily lives. In buildings without elevators it is inconvenient to lift the handcarts upstairs when loaded. It is proposed to provide additional wheels and support means therefor to the handcarts so as to allow the handcarts to climb.

The present invention provides an improved handcart which is collapsable and "stairs-climbable" without additional wheels.

SUMMARY OF THE INVENTION

It is an object of the present invention to provide a handcart which is able to be completely collapsed when not loaded and able to climb stairs when in a semi-collapsed status.

The present invention provides a handcart which generally includes a first axle on which a pair of wheels are rotatably mounted, a second axle on which a second pair of wheels are rotatably mounted, a substantially inverted U-shaped slanted handle member securely mounted on the second axle, and a collapsable basket means.

The collapsable basket means includes a first frame member adjacent to the first axle, a second frame member adjacent to and parallel to the first frame member, two side frame members pivotally disposed between the first and second frame members, and a bottom frame member for supporting shopped goods, vegetables, fruit, etc. The first frame member includes two side members whose lower ends are securely mounted to the first axle and a bottom member which includes an extension at both ends thereof to form a positioning member. The first side of the bottom frame member is pivoted to the bottom member and the second side of the bottom frame member is pivoted to a bottom member of the second frame member. Between the lower ends of the inverted U-shaped handle member, a supporting member extends above the second pair of wheels and below the bottom frame member, thereby supporting the bottom frame member when the handcart is in a fully extended status.

The handcart further includes a first pair of pivotal members each of which have a first end pivoted to the bottom member of the second frame member and a second end pivoted to a mediate portion of the handle member. The handcart further includes a second pair of pivotal members each of which have a first end pivoted to the mediate portion of the handle member and a second end. The second ends of the second pair of pivotal members are connected by a rod. Each second pivotal member has three recessed portions at an upper side thereof.

By such an arrangement, when the positioning member respectively engages with a lowermost, mediate, and uppermost recessed portions in the second pair of pivotal members, the handcart is in a fully extended, semi-collapsed, and fully collapsed status, respectively.

Preferably, the second pivotal members may have a cutout at a lower side thereof to at least partially receive the first axle such that the handcart can be completely collapsed. It is appreciated that more than three recessed portions may be formed in the upper side of the second pivotal members such that the handcart may be collapsed in a desired extent in response to stairs of various height.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
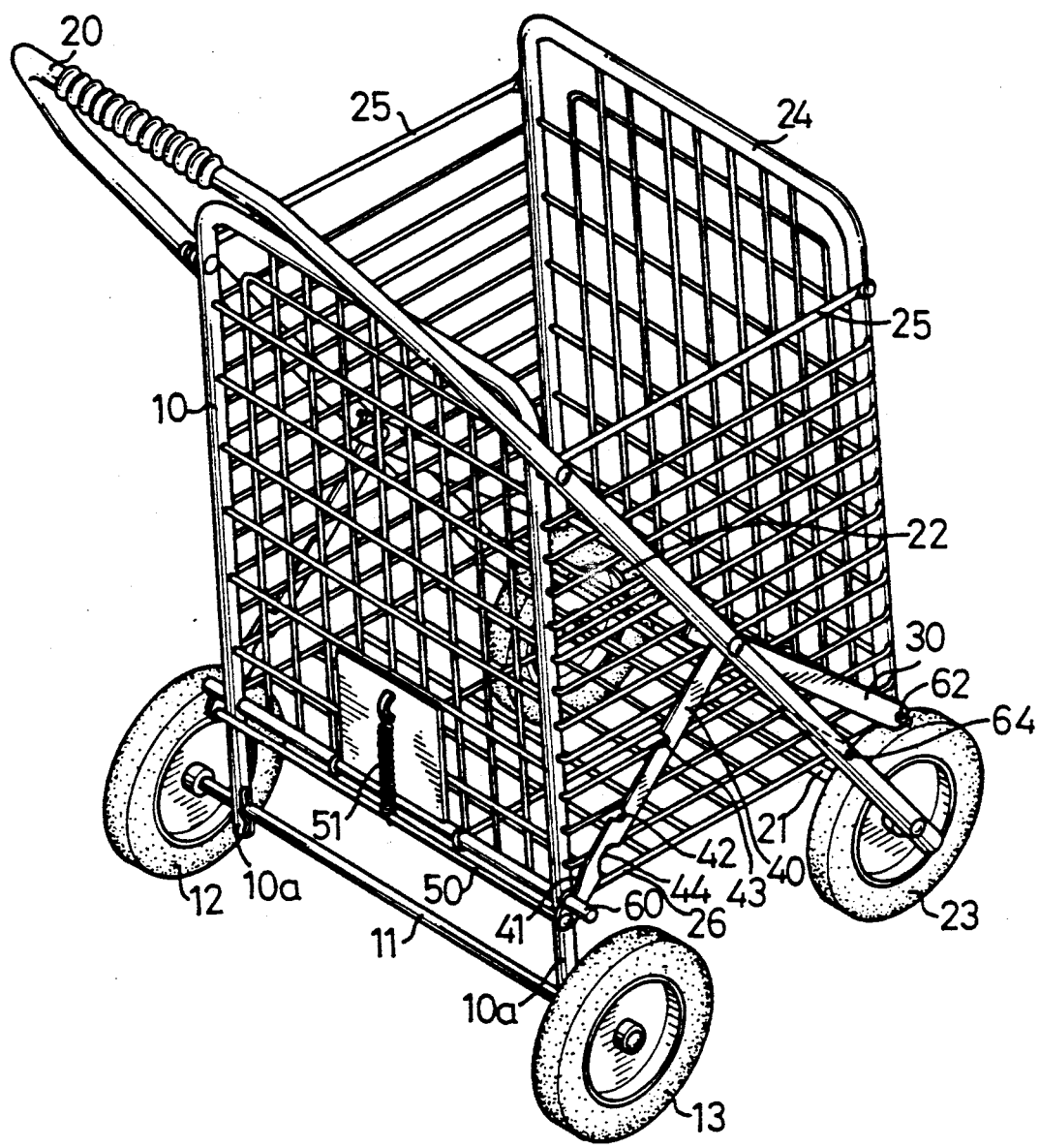
FIG. 1 is a perspective view of a collapsable handcart in accordance with the present invention.
Figure 2:
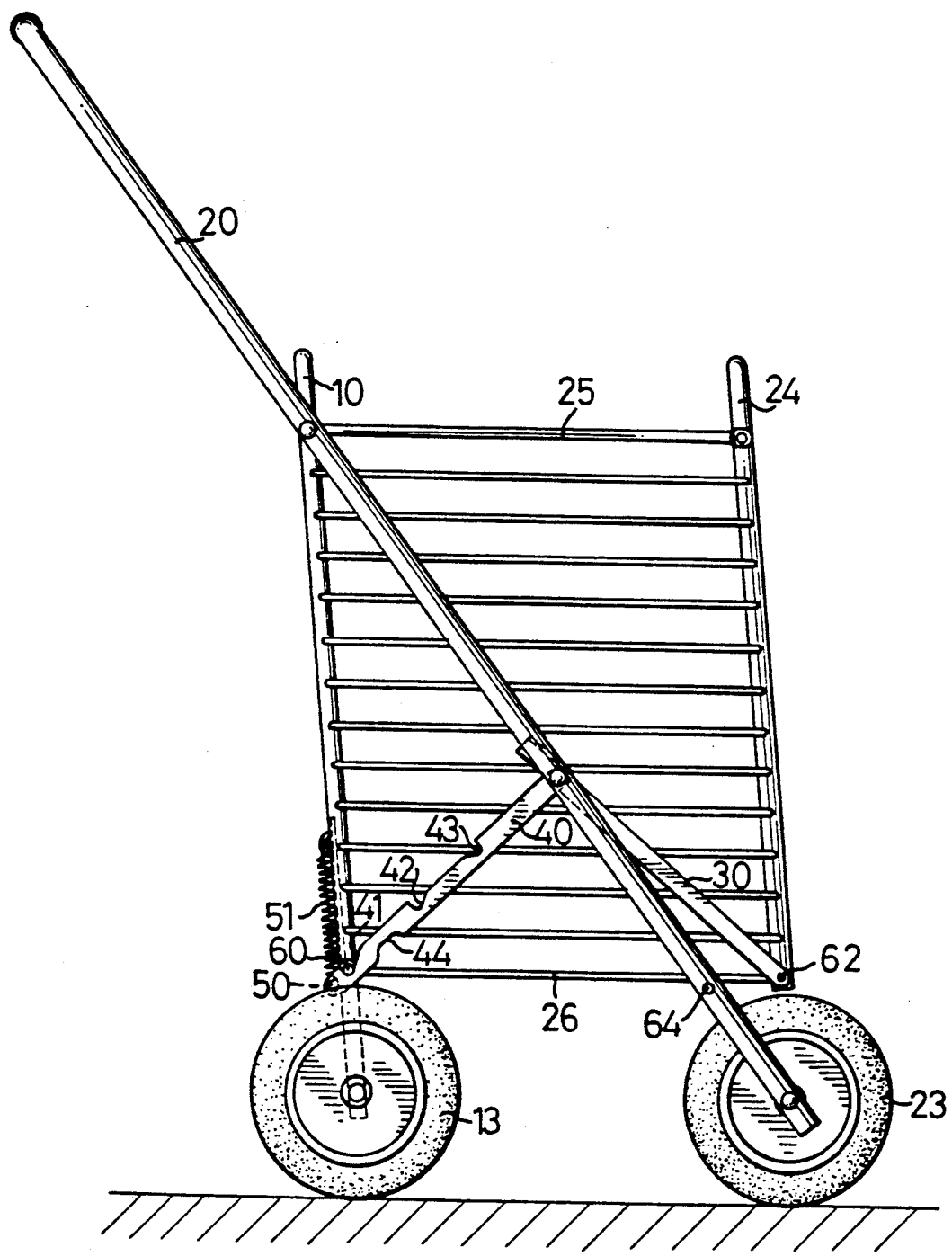
FIG. 2 is a side elevational view of the collapsable handcart in accordance with the present invention.

Referring to the drawings and initially to FIGS. 1 and 2, a collapsable handcart in accordance with the present invention generally includes a first axle 11 on which a pair of wheels 12 and 13 are rotatably mounted, a second axle 21 on which a second pair of wheels 22 and 23 are rotatably mounted, a substantially inverted U-shaped slanted handle member 20 securely mounted to the second axle 21 at two distal ends thereof, and a collapsable basket means.

The collapsable basket means includes a first frame member 10 adjacent to the first axle 11, a second frame member 24 adjacent to and parallel to the first frame member 10, two side frame members 25 pivotally disposed between the first and second frame members 10 and 24, and a bottom frame member 26 for supporting shopped goods, vegetables, fruit, etc. The first frame member 10 includes two side members 10a whose lower ends are securely mounted to the first axle 11 and a bottom member 60 which includes an extension at both ends thereof to form a positioning member. It is appreciated that the positioning member may be provided on a suitable position on the side members 10a. Alternatively, it can be two lugs extending laterally outward from the lower portion of the side members 10a to perform the positioning function. The first side of the bottom frame member 26 is pivoted to the bottom member 60 and the second side of the bottom frame member 26 is pivoted to a bottom member 62 of the second frame member 24. Between the lower ends of the inverted U-shaped handle member 20, a supporting member 64 extends above the second pair of wheels 22 and 23 and below the bottom frame member 26, thereby supporting the bottom frame member 26 when the handcart is in a fully extended status.

The handcart further includes a first pair of pivotal members 30 each of which have a first end pivoted to the bottom member 62 of the second frame member 24 and a second end pivoted to a mediate portion of the handle member 20. Alternatively, it can be two protrusions extending laterally outward from the bottom portion of the second frame member 24 to provide a pivotal function. The handcart further includes a second pair of pivotal members 40 each of which have a first end pivoted to the mediate portion of the handle member 20 and a second end. The second ends of the second pair of pivotal members 40 are connected by a rod 50. Each second pivotal member 40 has three recessed portions 41, 42, and 43 at an upper side thereof. A spring 51 has a first end secured to the first frame member 10 and a second end secured to the mediate portion of the rod 50.

Figure 3:
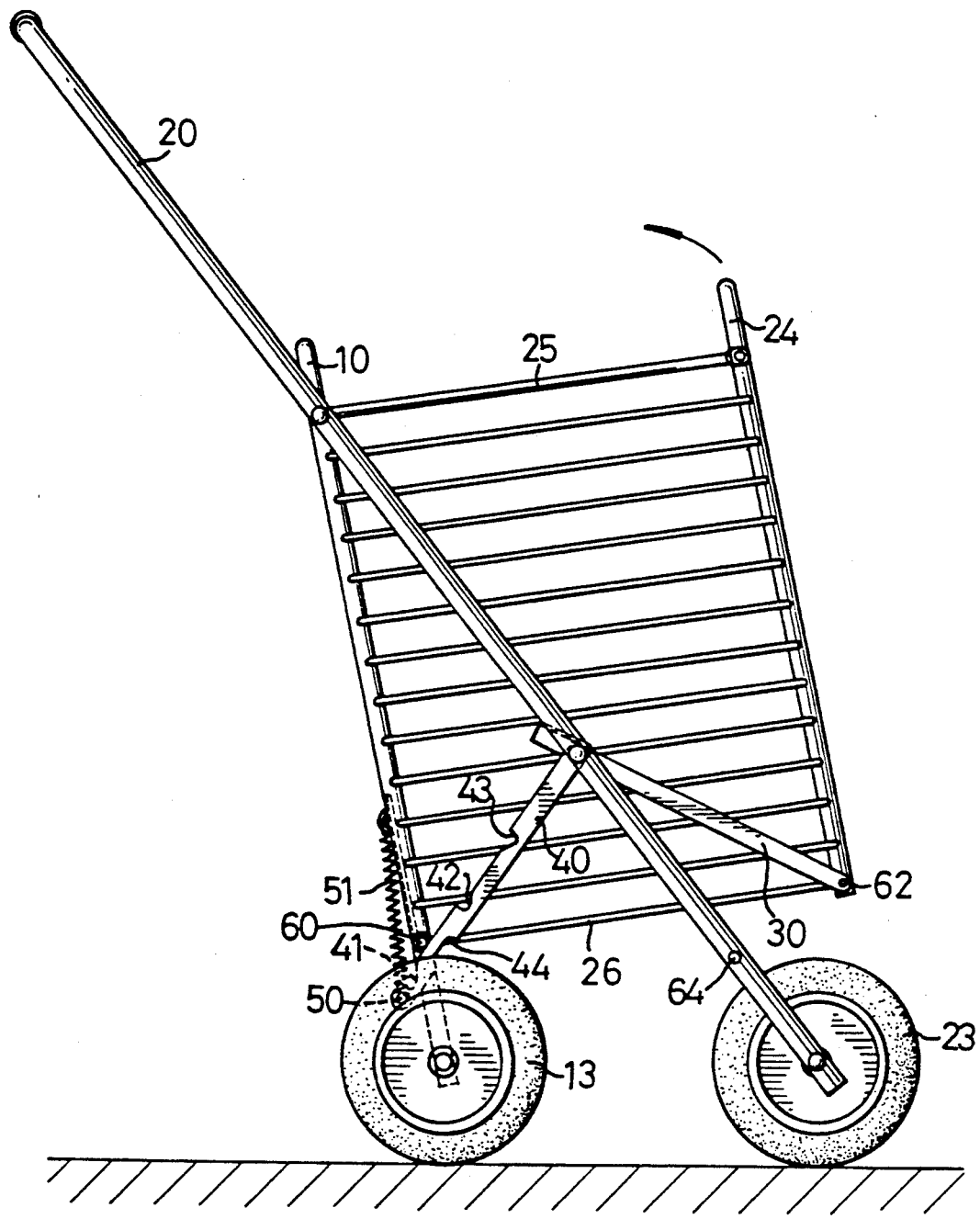
FIG. 3 is a view similar to FIG. 2 showing the collapsing operation of the handcart in accordance with the present invention.
Figure 4:
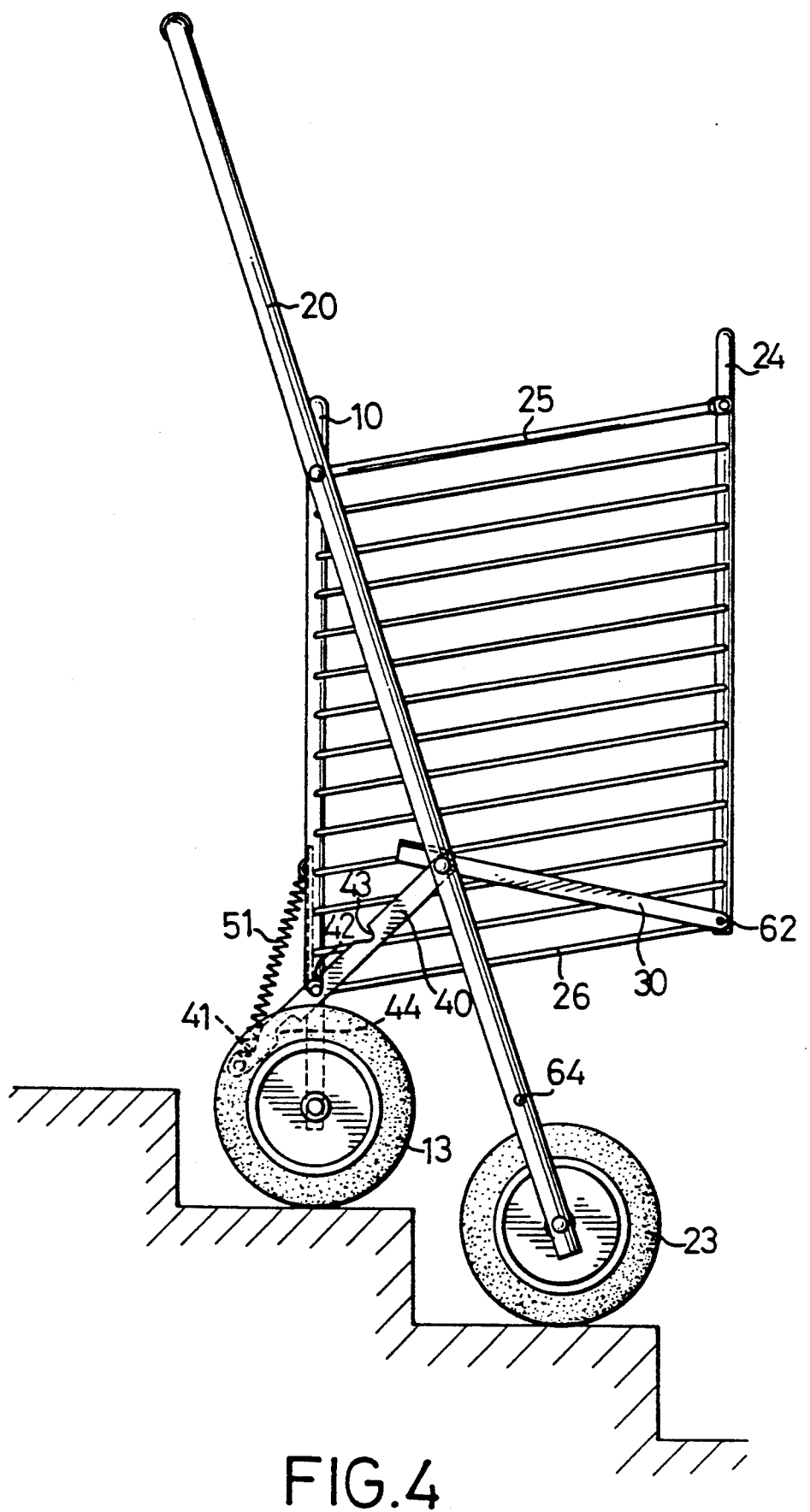
FIG. 4 is a schematic illustration of a semi-collapsed handcart in accordance with the present invention.
Figure 5:
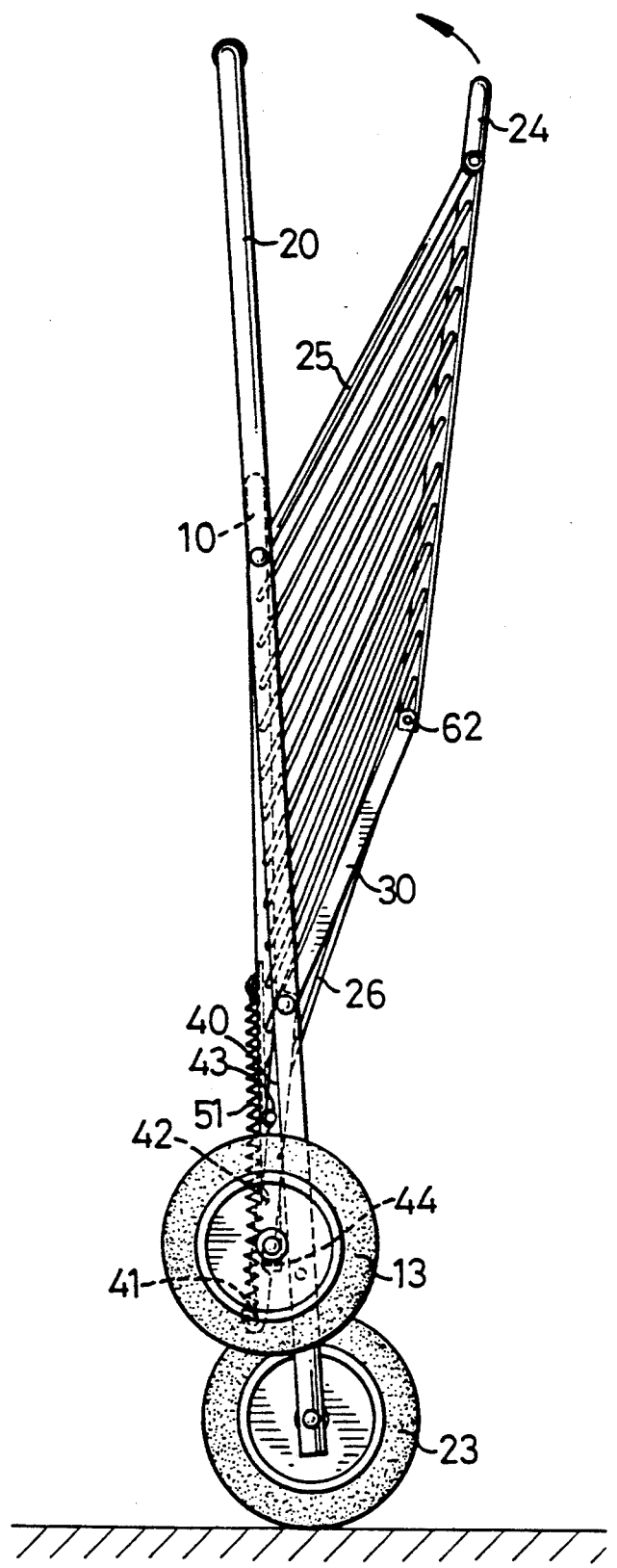
FIG. 5 is a view illustrating the complete collapsing operation of the handcart in accordance with the present invention.

The handcart in FIG. 2 is in a fully extended status in which the positioning member 60 engages with the lowermost recessed portions 41 in the second pair of pivotal members 40. After shopping and when stairs are to be climbed the user may use one of his hands to hold onto the upper end of the handle member 20 and use the other hand to hold onto the upper end of the second frame member 24 and pull it toward himself as indicated by the arrow in FIG. 3 such that the first axle 11 as well as the positioning member 60 move upward and toward the second axle 21 until the positioning member 60 engages with the second (mediate) recessed portions 42 in the second pair of pivotal members 40, thereby retaining the handcart in a semi-collapsed status as shown in FIG. 4. In this manner, the semi-collapsed handcart is still able to carry articles therein and further able to climb stairs. If the user intends to collapse the handcart completely, he may further pull the second frame member 24 toward himself such that the first axle 11 as well as the positioning member 60 move further upward and toward the second axle 21 until the positioning member 60 engages with the third (uppermost) recessed portions 43 in the second pivotal members, thereby retaining the handcart in a more-collapsed status as shown in FIG. 5. Thereafter, the user may further pivot the second frame member 24 toward the first frame member 10 to completely collapse the handcart.

When the user intends to unfold the completed collapsed handcart (the spring 51 is extended), he may simply pull the second frame member 24 away from the handle member 20 such that the handcart will be unfolded to a semi-collapsed status shown in FIG. 4 (the spring 51 is still extended). If the user intends to completely unfold the handcart, he may use one of his legs to press the rod 50 and use his hand slightly lift the handle member 20, the handcart will, under the spring force, be completely unfolded to a status shown in FIG. 2.

Preferably, each of the second pair of pivotal members 40 may have a cutout 44 at a lower side thereof to at least partially receive the first axle such that the handcart can be completely collapsed. Preferably, the width between the second pair of wheels 22 and 23 is less than that between the first pair of wheels 12 and 13. It is appreciated that more than three recessed portions may be formed in the upper side of the second pair of pivotal members 40 such that the handcart may be collapsed in a desired extent in response to stairs of various height.

Although the invention has been explained in relation to its preferred embodiment, it is to be understood that many other possible modifications and variations can be made without departing from the spirit and scope of the invention as hereinafter claimed.

I claim:

1. A collapsable handcart comprising:
   a first axle (11) on which a first wheel means (12 and 13) is rotatably mounted;
   a second axle (21) on which a second wheel means (22 and 23) is rotatably mounted;
   a substantially inverted U-shaped slanted handle member (20) securely mounted on said second axle (21) at two distal ends thereof;
   a collapsable basket means comprising:
     a first frame member (10) adjacent to said first axle (11),
     a second frame member (24) adjacent to and parallel to said first frame member (10),
     two side frame members (25) pivotally disposed between said first and second frame members (10 and 24), and
     a bottom frame member (26) for supporting articles, having a first side pivoted to a lower portion of said first frame member and a second side pivoted to a bottom portion of said second frame member,
   a positioning member (60) extending laterally outward from a lower portion of said first frame member (10);
   supporting member (64) extending between lower ends of said inverted U-shaped handle member (20) and above said second wheel means (22 and 23) and below said bottom frame member (26);
   a first pair of pivotal members (30) each of which having a first end pivoted to said bottom portion of said second frame member (24) and a second end pivoted to a mediate portion of said handle member (20); and
   a second pair of pivotal members (40) each of which having a first end pivoted to the mediate portion of said handle member (20) and a second end, and a rod (50) for connecting said second ends of said second pair of pivotal members (40), each said second pair of pivotal members (40) having a plurality of recessed portions at an upper side thereof;
   whereby when said positioning member respectively engages with a lowermost one of said plurality of recessed portions, mediate recessed portions, and uppermost one of said plurality of recessed portions in the second pair of pivotal members, the handcart is in a fully extended, partially collapsed, and fully collapsed status, respectively.

2. The collapsable handcart as claimed in claim 1 further comprising a spring (51) having a first end secured to said first frame member (10) and a second end secured to a mediate portion of said rod (50).

3. The collapsable handcart as claimed in claim 1 wherein each of said second pair of pivotal members (40) have a cutout (44) at a lower side thereof.

4. The collapsable handcart as claimed in claim 1 wherein said first wheel means includes a pair of spaced wheels (12 and 13), said second wheel means including a second pair of wheels (22 and 23), and a width between said second pair of wheels is less than that between said first pair of wheels.

* * * * *